(12) United States Patent
Peric

(10) Patent No.: US 7,735,520 B2
(45) Date of Patent: Jun. 15, 2010

(54) TUBULAR FLAPPER VALVES

(75) Inventor: Yuri Peric, Oakville (CA)

(73) Assignee: Dana Canada Corporation, Oakville, Ontario (CA)

( * ) Notice: Subject to any disclaimer, the term of this patent is extended or adjusted under 35 U.S.C. 154(b) by 433 days.

(21) Appl. No.: 11/756,981

(22) Filed: Jun. 1, 2007

(65) Prior Publication Data
US 2008/0023190 A1  Jan. 31, 2008

Related U.S. Application Data

(63) Continuation-in-part of application No. 11/110,409, filed on Apr. 20, 2005, now abandoned.

(51) Int. Cl.
*F16K 15/16* (2006.01)
(52) U.S. Cl. .................. 137/855; 165/280; 165/284; 165/916
(58) Field of Classification Search .......... 165/280, 165/283, 284, 297, 916, 167; 137/855–858, 137/454.2, 454.4, 454.5, 454.6, 860
See application file for complete search history.

(56) References Cited

U.S. PATENT DOCUMENTS

| | | |
|---|---|---|
| 1,690,501 A | 11/1928 | Potts |
| 1,860,163 A | 5/1932 | Wyzenbeek |
| 2,698,063 A | 12/1954 | Brubaker |
| 2,826,448 A | 3/1958 | Jones |
| 3,289,693 A | 12/1966 | Scaramucci |
| 3,568,712 A | 3/1971 | Rinehart |
| 3,621,868 A | 11/1971 | Wise |
| 3,949,716 A | 4/1976 | Liu |
| 3,990,604 A | 11/1976 | Barnett et al. |
| 3,998,243 A | 12/1976 | Osterkorn et al. |
| 3,998,571 A | 12/1976 | Falke |
| 4,179,051 A | 12/1979 | Thomas |
| 4,193,442 A | 3/1980 | Vian |
| 4,199,309 A | 4/1980 | Connor |
| 4,337,737 A | 7/1982 | Pechner |
| 4,360,055 A | 11/1982 | Frost |
| 4,373,561 A | 2/1983 | Berger |
| 4,425,067 A | 1/1984 | Krezak |

(Continued)

FOREIGN PATENT DOCUMENTS

CA  1005319  2/1977

(Continued)

OTHER PUBLICATIONS

International Search Report dated Aug. 3, 2006 issued in PCT case PCT/CA2006/000595.

*Primary Examiner*—John Rivell
*Assistant Examiner*—Craig M Schneider
(74) *Attorney, Agent, or Firm*—Ridout & Maybee LLP

(57) ABSTRACT

Disclosed is a bypass valve assembly for a fluid device, such as a heat exchanger having an inlet and an outlet. The assembly defines a bypass passage communicating with the inlet at one end. A tubular structure communicates with the outlet and has a bypass aperture in a sidewall thereof which communicates with the other end of the bypass passage. A semi-cylindrical spring flapper is fitted in the tubular structure and opens to allow bypass flow when the pressure in the bypass passage exceeds a predetermined limit.

12 Claims, 10 Drawing Sheets

U.S. PATENT DOCUMENTS

| | | |
|---|---|---|
| 4,471,804 A | 9/1984 | Bauer et al. |
| 4,561,494 A | 12/1985 | Frost |
| 4,669,532 A | 6/1987 | Tejima et al. |
| 4,871,013 A | 10/1989 | Nilsson et al. |
| 5,078,209 A | 1/1992 | Kerkman et al. |
| 5,146,980 A | 9/1992 | Le Gauyer |
| 5,174,504 A | 12/1992 | Halvorsen |
| 5,236,043 A | 8/1993 | Armbruster et al. |
| 5,273,385 A | 12/1993 | Rose et al. |
| 5,351,664 A | 10/1994 | Rotter et al. |
| 5,380,176 A | 1/1995 | Kikuchi et al. |
| 5,411,057 A | 5/1995 | Pouchot |
| 5,499,675 A | 3/1996 | Haasch et al. |
| 5,544,699 A | 8/1996 | Robers et al. |
| 5,558,346 A | 9/1996 | Hartery |
| 5,575,329 A | 11/1996 | So et al. |
| 5,588,485 A | 12/1996 | Gire |
| 5,595,214 A | 1/1997 | Shaffer et al. |
| 5,609,476 A | 3/1997 | Kim et al. |
| 5,765,632 A | 6/1998 | Gire |
| 5,921,273 A | 7/1999 | Ono et al. |
| 5,950,589 A | 9/1999 | Armbruster |
| 6,139,291 A | 10/2000 | Perevozchikov |
| 6,293,774 B1 | 9/2001 | Brabek |
| 6,298,910 B1 | 10/2001 | Komoda et al. |
| 6,358,024 B1 | 3/2002 | Djordjevic |
| 6,382,305 B1 | 5/2002 | Sano |
| 6,412,514 B1 | 7/2002 | Raftis |
| 6,427,768 B2 | 8/2002 | Komoda et al. |
| 6,460,613 B2 | 10/2002 | Nash et al. |
| 6,461,126 B1 | 10/2002 | Pierobon |
| 6,471,490 B2 | 10/2002 | Kimura et al. |
| 6,814,133 B2 | 11/2004 | Yamaguchi |
| 7,222,641 B2 | 5/2007 | Peric |
| 2003/0019620 A1 | 1/2003 | Pineo et al. |
| 2003/0185695 A1 | 10/2003 | Sieberg |
| 2006/0102240 A1 | 5/2006 | Spiegl et al. |
| 2006/0237077 A1 | 10/2006 | Peric et al. |
| 2006/0237078 A1 | 10/2006 | Luvisotto et al. |
| 2006/0237079 A1 | 10/2006 | Cheadle et al. |
| 2006/0237183 A1 | 10/2006 | Peric et al. |
| 2008/0110605 A1 | 5/2008 | Richter |

FOREIGN PATENT DOCUMENTS

| | | |
|---|---|---|
| CA | 1102210 | 6/1981 |
| CA | 1122968 | 5/1982 |
| GB | 1 545 710 | 5/1979 |
| WO | WO 2005/048890 | 6/2005 |

… # TUBULAR FLAPPER VALVES

This application is a continuation-in-part of U.S. application Ser. No. 11/110,409 filed Apr. 20, 2005, now abandoned the entire disclosure of which is incorporated herein by reference.

FIELD OF THE INVENTION

This invention relates to valves, and in particular, to flapper valves.

BACKGROUND OF THE INVENTION

Automotive fluids, such as engine oil or transmission fluids, absorb heat in use. To prevent fluid deterioration, this heat often needs to be removed. Heat exchangers are commonly used for this purpose. Moreover, heat exchangers are known to perform this function adequately in moderate ambient conditions. However, in cold ambient conditions, engine oils and transmission fluids can be highly viscous. In such conditions, these automotive fluids do not flow easily through heat exchangers. As a result, in such conditions, the fluid pressure within the lubrication circuit, and particularly within the heat exchangers, can be high enough to damage the heat exchangers. In some cases, starvation of some downstream components, like transmissions, may even occur.

In order to avoid these adverse effects, it is known to provide a mechanism for bypassing the heat exchanger. One way that this has been done in the past is to provide a bypass conduit. The bypass conduit is connected in parallel with the heat exchanger and has a relatively low resistance to the flow of high viscosity fluids as compared to the heat exchanger. Structures of this type are known to provide pressure relief for the heat exchanger and avoid starvation of the downstream components, but can suffer in that, in normal operating conditions, the flow is split between the heat exchanger and the bypass circuit. This requires that the heat exchangers be made proportionately larger and heavier to achieve the same overall heat exchange performance for the cooling system. This added size and weight, and the associated costs therewith, are undesirable to automotive manufacturers.

In U.S. Pat. No. 4,193,442 issued to David R. Vian, a heat exchanger is coupled to an adapter which is positioned between an oil filter and the engine. The adapter includes a valve in the form of a bimetallic strip that opens under normal operating conditions to allow flow through the heat exchanger, and closes in cold conditions to prevent flow through the heat exchanger. A difficulty with the Vian device, however, is that it is a rather large and bulky structure, and it still does not protect the heat exchanger from high fluid pressures in all conditions, especially if the oil filter is plugged or partially plugged.

SUMMARY OF THE INVENTION

In the present invention, a simple, low-profile bypass valve assembly is provided. The bypass valve assembly utilizes a tubular flapper valve, and can be readily attached to any heat exchanger or other fluid device having a fluid inlet and a fluid outlet. The assembly provides for selective bypass flow between the fluid inlet and the fluid outlet, without preventing flow from the fluid outlet of the fluid device, yet being responsive to excessive pressures in the fluid inlet of the fluid device.

A bypass valve assembly for use with a fluid device having an inlet and an outlet forms one aspect of the invention. The assembly comprises a generally flat main body member, a flexible flapper, locating means and bias means. The body member has: means defining a transverse inlet opening therethrough; a cylindrical wall portion defining a transverse outlet opening therethrough spaced from the inlet opening and orientated coaxially with the fluid device outlet, the cylindrical wall portion having a bypass opening formed therein; and means defining a bypass passage formed in the generally flat main body member and extending between the inlet opening and the bypass opening. The inlet and outlet openings are adapted to be coupled in fluid communication respectively with the fluid device inlet and outlet for fluid flow through the fluid device. The flexible flapper is disposed within the outlet opening and has a free end portion movable between an open position, apart from the bypass opening, and a closed position, overlying the bypass opening, the free end portion being dimensioned to restrict flow through the bypass opening when disposed at its closed position. The locating means is for maintaining the location of the flapper in the outlet opening. The bias means is for biasing the flapper into the closed position.

A heat exchanger forms another aspect of the invention and comprises a heat exchange element and a bypass valve assembly. The heat exchange element has a spaced-apart inlet and outlet and a plurality of heat exchange passages therebetween. The bypass valve assembly includes a generally flat main body member, a flexible flapper, locating means and bias means. The generally flat main body member is connected to the heat exchange element and has: means defining a transverse inlet opening therethrough communicating with the heat exchange element inlet; a cylindrical wall portion defining a transverse outlet opening therethrough orientated coaxially and communicating with the heat exchange element outlet, the cylindrical wall portion having a bypass opening formed therein; and means defining a bypass passage formed in the generally flat main body member and extending between the inlet opening and the bypass opening. The flexible flapper is disposed within the outlet opening and has a free end portion movable between an open position, spaced from the bypass opening, and a closed position, overlying the bypass opening, the free end portion being dimensioned to restrict flow through the bypass opening when disposed at its closed position. The locating means is for maintaining the location of the flapper in the outlet opening. The bias means is for biasing the flapper into the closed position.

A heat exchanger forms another aspect of the invention and comprises a heat exchange element and a bypass valve assembly. The heat exchange element has a spaced-apart inlet and outlet and a plurality of heat exchange passages extending therebetween. The bypass valve assembly includes a generally flat main body member and a flexible flapper. The body member is connected to the heat exchange element and has: a transverse inlet opening extending therethrough and communicating with the heat exchange element inlet; a cylindrical wall portion defining a transverse outlet opening extending through the body member, orientated coaxially and communicating with the heat exchange element outlet, the cylindrical wall portion having a bypass opening formed therein; and a bypass passage formed in the generally flat main body member and extending between the inlet opening and the bypass opening. The flexible flapper is disposed within the outlet opening. The flapper has: a free end portion movable between an open position, spaced from the bypass opening, and a closed position, overlying the bypass opening, the free end portion being dimensioned to restrict flow through the bypass opening when disposed at its closed position; and a fixed end portion located in a fixed position in the outlet opening. The flapper is biased for movement into the closed position.

A heat exchanger forms another aspect of the invention. The heat exchanger comprises a heat exchange element and a bypass valve assembly. The heat exchange element has: an inlet; an outlet spaced apart from the inlet; and a plurality of heat exchange passages extending between the inlet and outlet. The bypass valve assembly includes a tube and flexible flapper. The tube is coupled to the heat exchange element to receive flow from the outlet and has a sidewall defining a bypass aperture. The flapper is disposed within the tube and has a free end portion and a fixed end portion. The free end portion is movable between an open position, spaced from the bypass aperture, and a closed position, overlying the bypass aperture, and is dimensioned to restrict flow through the bypass aperture when disposed at its closed position. The fixed end portion is located in a fixed position in the tube. The flapper is biased for movement into the closed position and the bypass valve assembly defines a bypass passage extending between the inlet and the bypass aperture.

Advantages, features and characteristics of the present invention, as well as methods of operation and functions of the related elements of the structure, and the combination of parts and economies of manufacture, will become apparent upon consideration of the following detailed description with reference to the accompanying drawings, the latter of which is briefly described hereinafter.

BRIEF DESCRIPTION OF THE DRAWINGS

In the accompanying drawings, which are for the purpose of illustration and description only, and are not intended as a definition of the limits of the invention.

DESCRIPTION OF THE PREFERRED EMBODIMENTS

Figure 1:
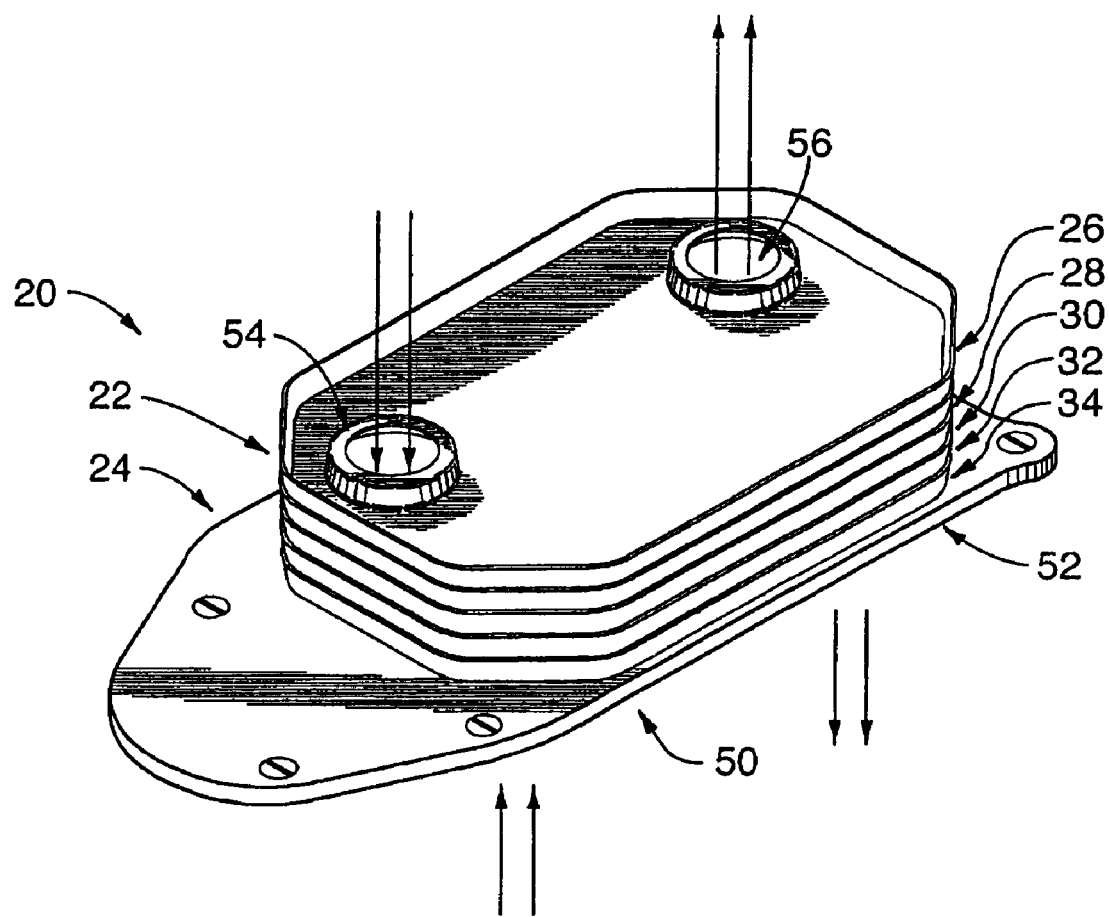
FIG. 1 is a perspective view of a bypass and valve assembly according to a preferred embodiment of the present invention in use in a heat exchanger.
Figure 2:
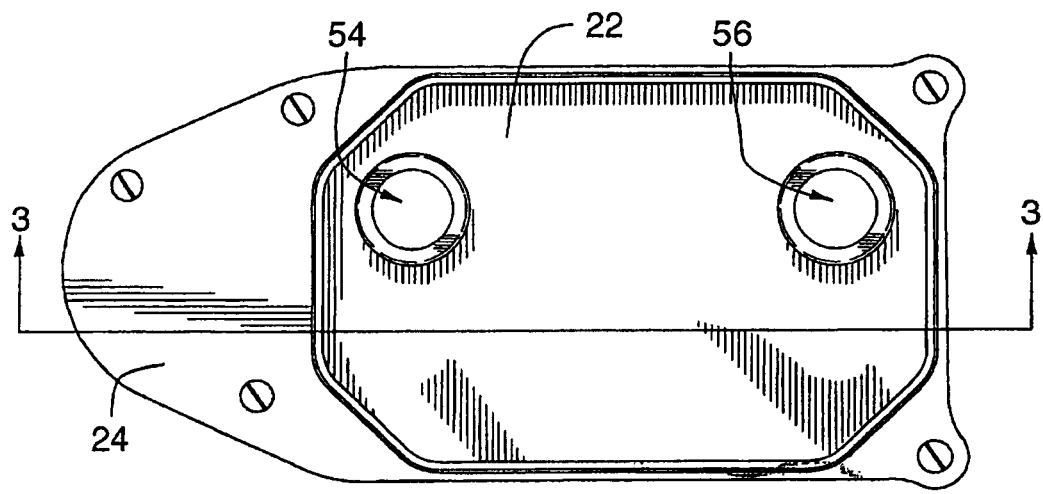
FIG. 2 is a top plan view of the structure of FIG. 1.
Figure 3:
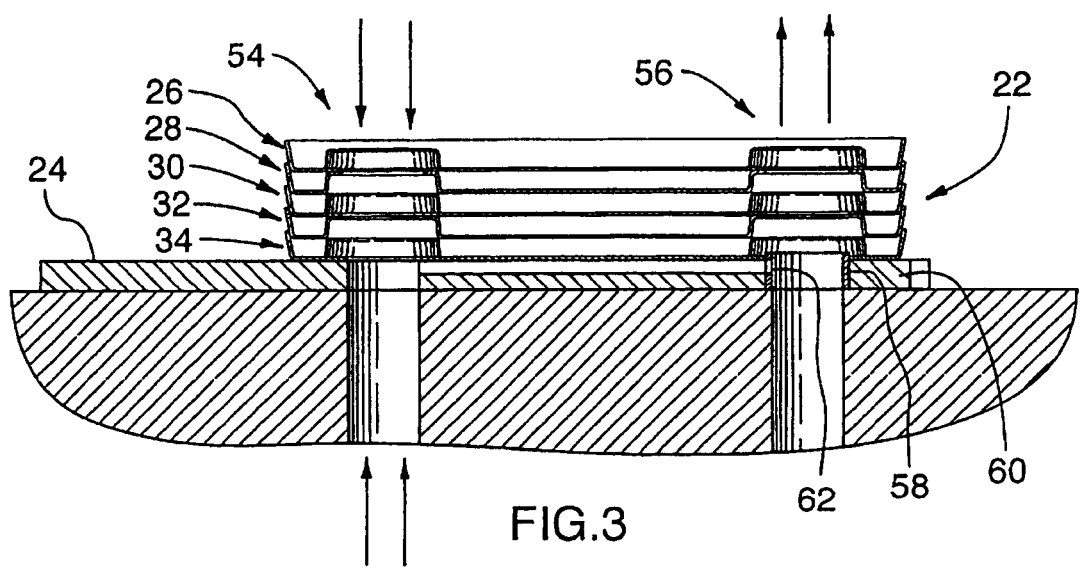
FIG. 3 is a cross-sectional view of the structure of FIG. 1, taken along lines 3-3 of FIG. 2.

FIGS. 1 to 3 show a heat exchanger 20, which includes a fluid device, such as a heat exchange element 22, and a bypass valve assembly 24 constructed according to a preferred embodiment of the present invention. The heat exchanger 20 may be used as an oil cooler in a circuit for lubricating mechanical components (not shown).

Figure 4:
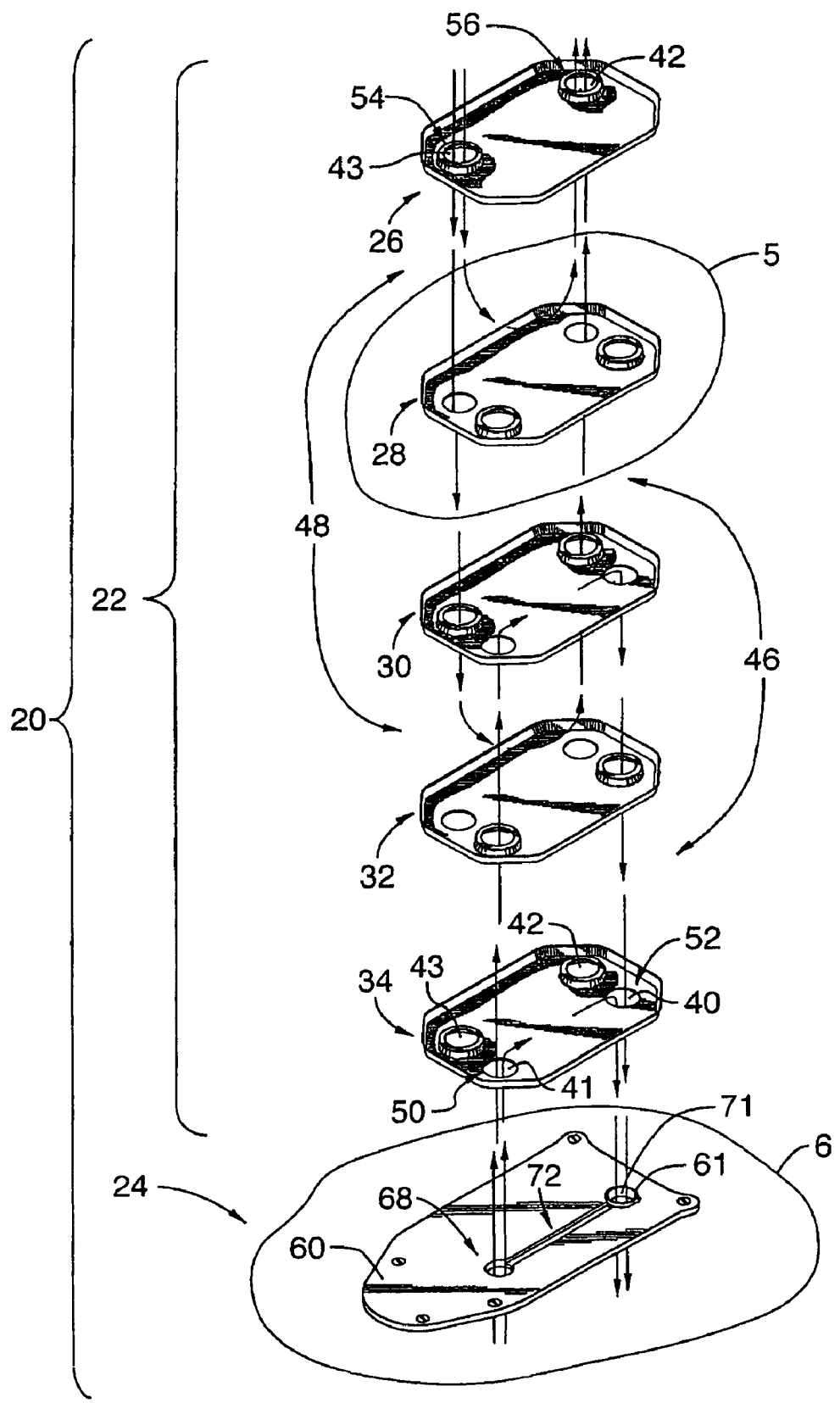
FIG. 4 is an exploded perspective view of the heat exchanger of FIG. 1.
Figure 5:
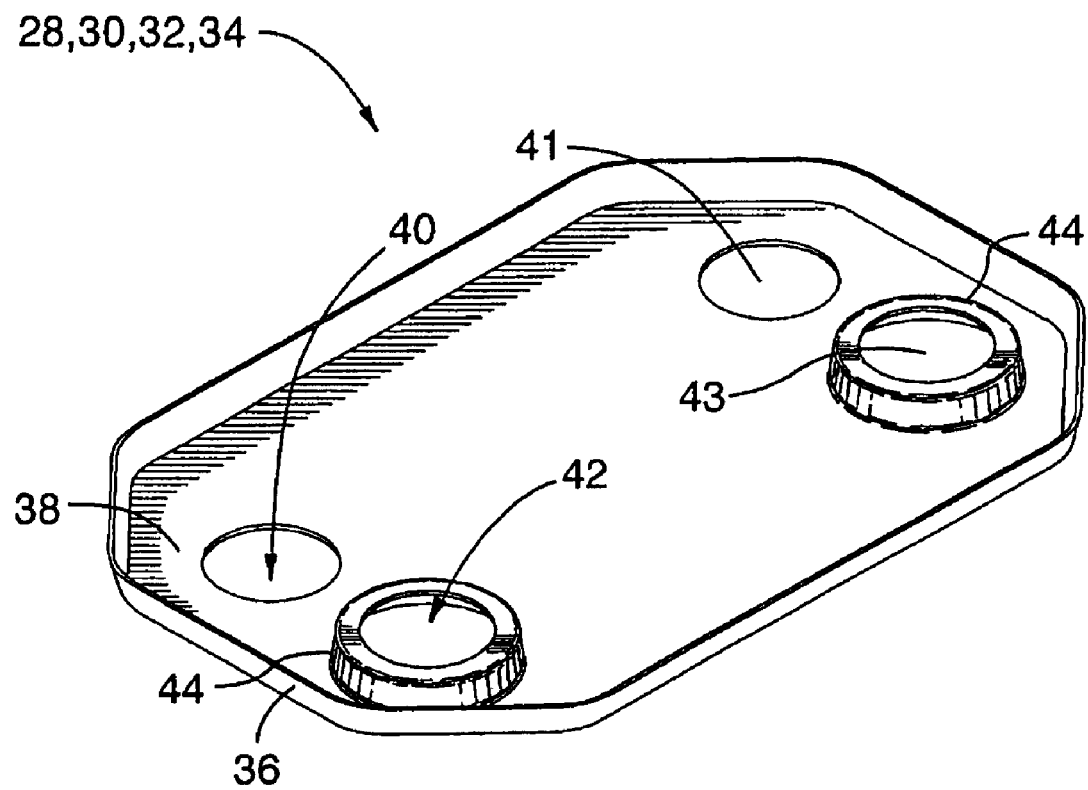
FIG. 5 is an enlarged view of encircled area 5 in FIG. 4.

As best seen in FIG. 4, wherein the heat exchanger 20 is shown in exploded perspective, the heat exchange element 22 is formed of a plurality of stamped aluminum passage-forming plates 26,28,30,32 and 34. Any number of plates 28 to 34 may be used in heat exchange element 22, as desired. Passage-forming plates 28, 30, 32 and 34 are of identical construction. Each includes, as seen in FIG. 5, a peripheral, upwardly and outwardly flaring flange or ridge 36 and a substantially planar central portion 38. The planar central portion 38 is punctuated with two pairs of apertures, namely, apertures 40, 41 and apertures 42, 43. The apertures 42, 43 are ringed with respective raised bosses 44. Passage-forming plate 26 is of similar construction to plates 28, 30, 32, 34 but lacks the pair of apertures 40, 41.

Plates 26, 28, 30, 32 and 34 are stacked upon one another in nesting, alternating front-to-back and back-to-front orientation and sealed by brazing. As so sealed, plates 26, 28, 30, 32 and 34 form heat exchange paths or passages 46 and 48 therebetween (see FIG. 4), for oil and engine coolant, respectively, in heat exchange relationship to one another. One or the other of the apertures 40, 41, namely aperture 41 in plate 34 defines an inlet 50, and the other of the apertures 40, 41 forms an outlet 52, respectively, for receiving and discharging oil into and from oil passages 46 between plates 32, 34 and 28, 30. Apertures 43 and 42 in plate 26 define a first coolant port 54 and a second coolant port 56, respectively, for receiving and discharging engine coolant into and from the coolant passages 48 between plates 26, 28 and 30, 32. The exact form of heat exchange element 22 is not considered to be part of the present invention, so will not be described in further detail herein.

Figure 6:
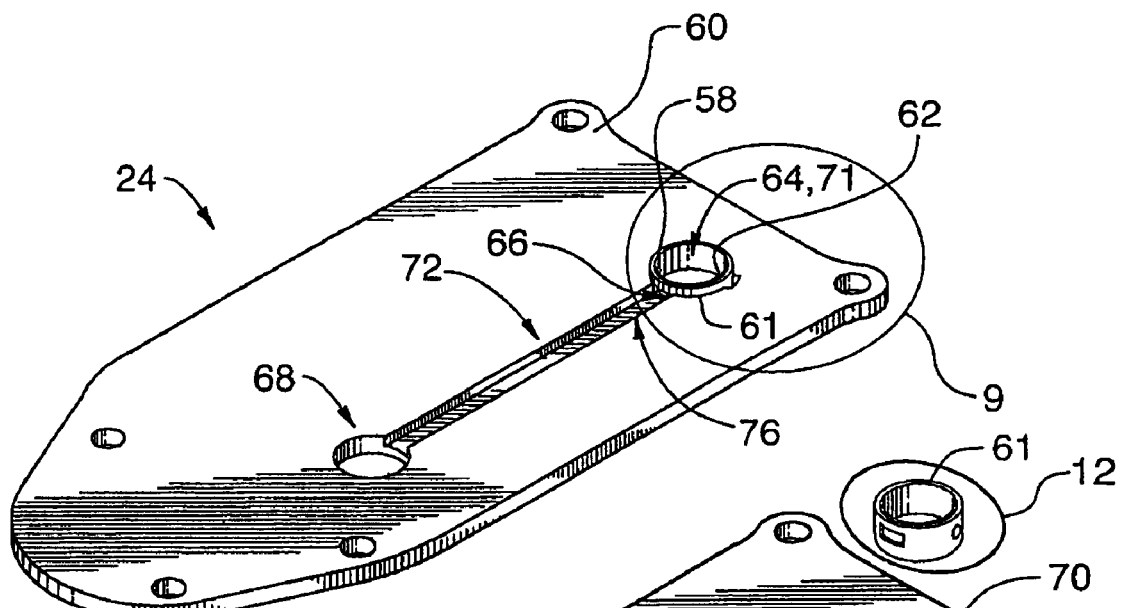
FIG. 6 is an enlarged view of encircled area 6 in FIG. 4.
Figure 7:
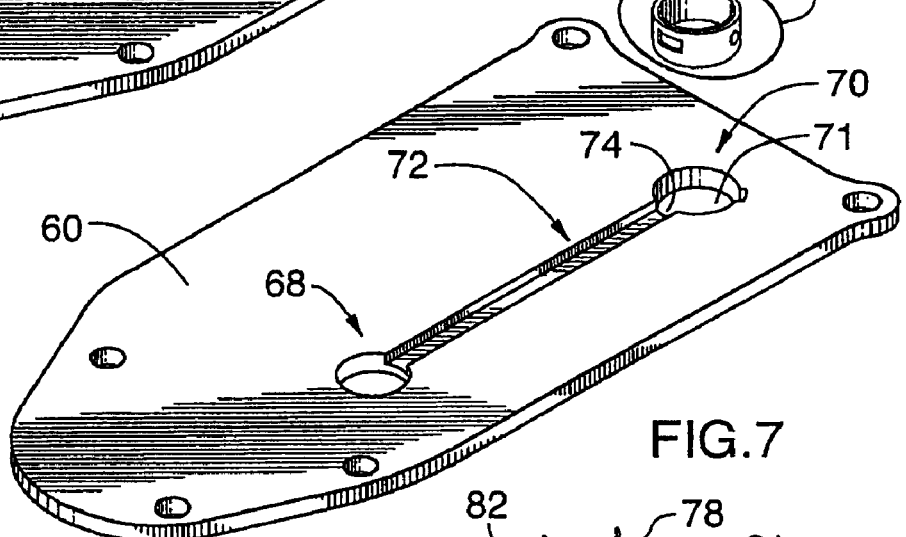
FIG. 7 is a partially exploded view of the structure of FIG. 6.

Referring to FIGS. 4 and 6, the bypass valve assembly 24 includes a main body member 60 and a flapper valve 61. Flapper valve 61 has a tubular member or tube 58 and a flexible or resilient flapper 62.

Figure 8:
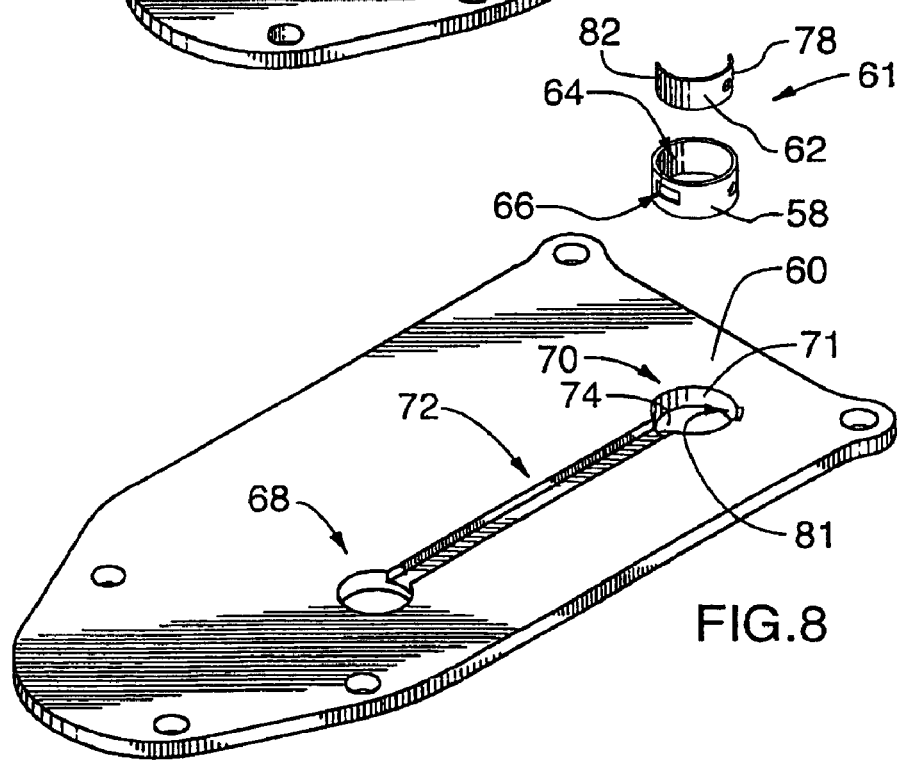
FIG. 8 is a fully exploded view of the structure of FIG. 6.
Figure 9:
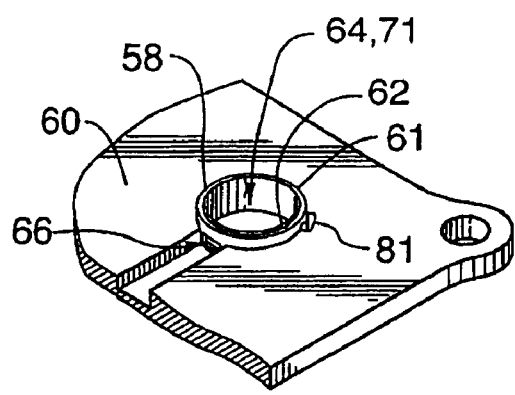
FIG. 9 is an enlarged view of encircled area 9 in FIG. 6.

The main body member 60 is a substantially planar, stamped or machined plate, arranged beneath plate 34 and brazed thereto, thereby to occlude aperture pair 42, 43 of plate 34. As best illustrated in FIGS. 4 and 8, the main body member 60 defines an inlet opening 68 in fluid communication with the inlet 50 for receiving oil to be cooled by heat exchange element 22. Main body member 60 also has a cylindrical wall portion 70 which defines an outlet opening 71 spaced from inlet opening 68 and orientated coaxially and communicating with heat exchange element outlet 52. Main body member 60 also includes a bypass passage 72 extending between the inlet opening 68 and a bypass aperture or opening 74 formed in cylindrical wall portion 70.

The tube 58 is releasably mounted within the cylindrical wall portion 70, and is dimensioned to be frictionally held within outlet opening 71. The interior of the tube 58 then defines the actual outlet opening 64 that is in fluid communication with the outlet 52 of heat exchange element 22 to receive oil therefrom and deliver it to the lubrication circuit (not shown) to return oil thereto. The wall of tube 58 has a bypass aperture 66 (see FIG. 8) formed therethrough in communication with the cylindrical wall portion bypass aperture 74, to permit fluid communication between the outlet opening 64 and the bypass passage 72.

As seen best in FIGS. 6, 9, 11 and 15, tube 58 extends slightly above the top surface of main body member 60. This helps to locate heat exchange element 22, because opening 40 in plate 34 can be located on tube 58 during assembly of heat exchange 20.

The flexible flapper 62 is disposed in the outlet opening 64. A mounting end portion 78 of the flapper 62 is mounted to tube 58 by a locating means in the form of a rivet 80 (see FIGS. 10 and 11). As indicated in FIG. 8 and FIG. 10B, the rivet 80 is partially located in a transverse groove or indent 81 formed in the cylindrical wall portion 70. The rivet 80 and the transverse groove 81 act in the manner of a key and keyway so as to ensure suitable axial positioning of the tube 58. The flapper 62 extends, from mounting end portion 78, in an arc spanning approximately one-half of the inner circumference of the cylindrical wall portion 70 or tube 58, to a free end portion 82 remote from mounting end portion 78.

Figure 10A:
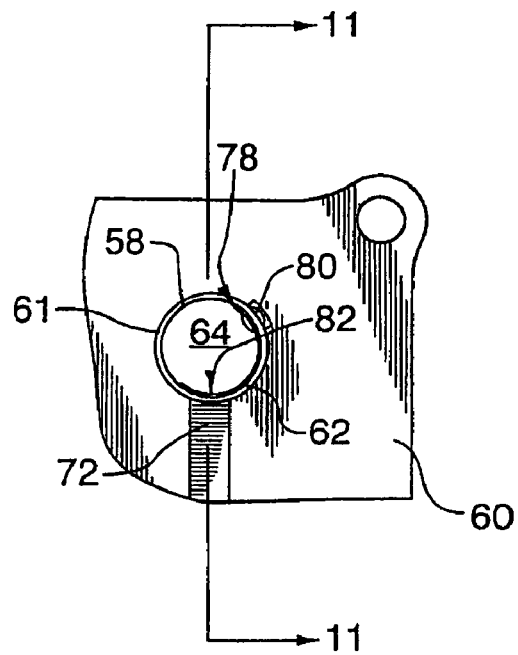
FIG. 10A is a top plan view of the structure of FIG. 9, wherein the free end portion of the flapper valve is disposed at its closed position.
Figure 10B:
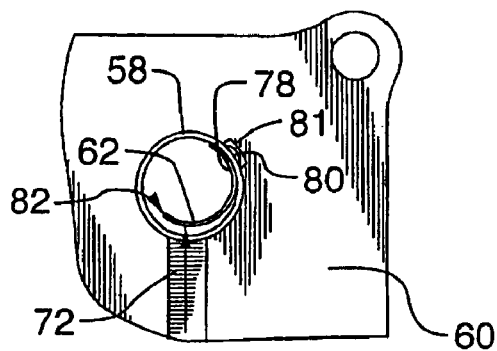
FIG. 10B is a view similar, to FIG. 10A, with the free end portion of the flapper valve disposed at its open position.
Figure 11:
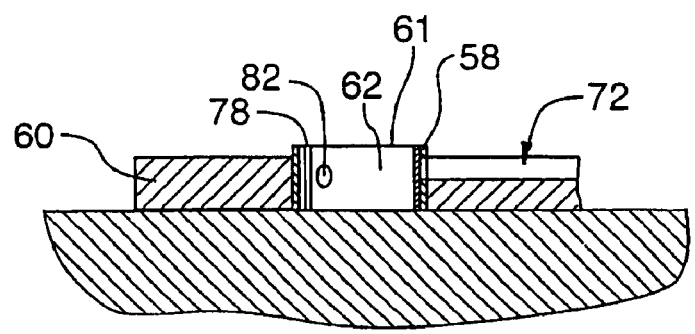
FIG. 11 is a cross-sectional view of the structure of FIG. 9, taken along line 11-11 of FIG. 10A.
Figure 12:
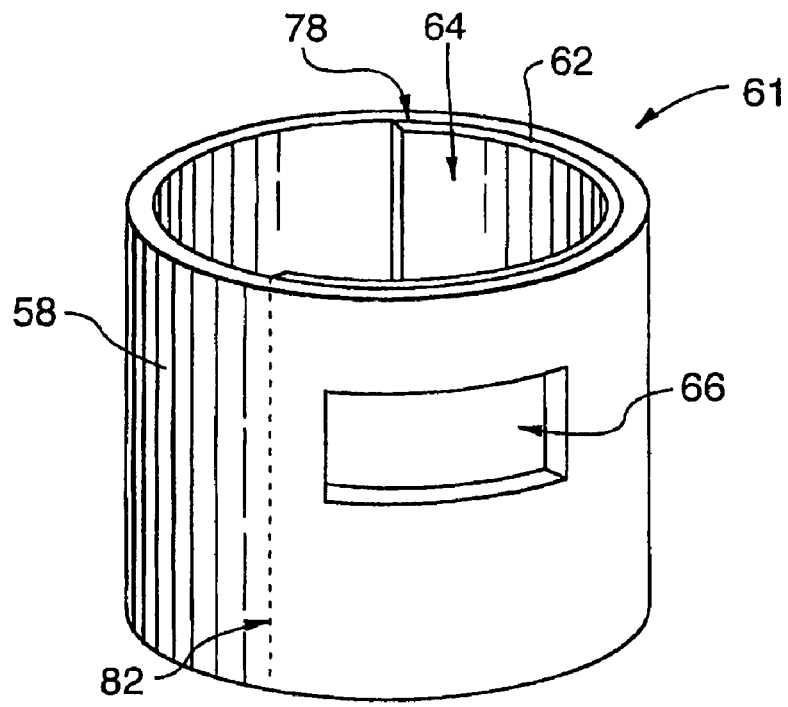
FIG. 12 is an enlarged view of the encircled area 12 in FIG. 7.
Figure 13:
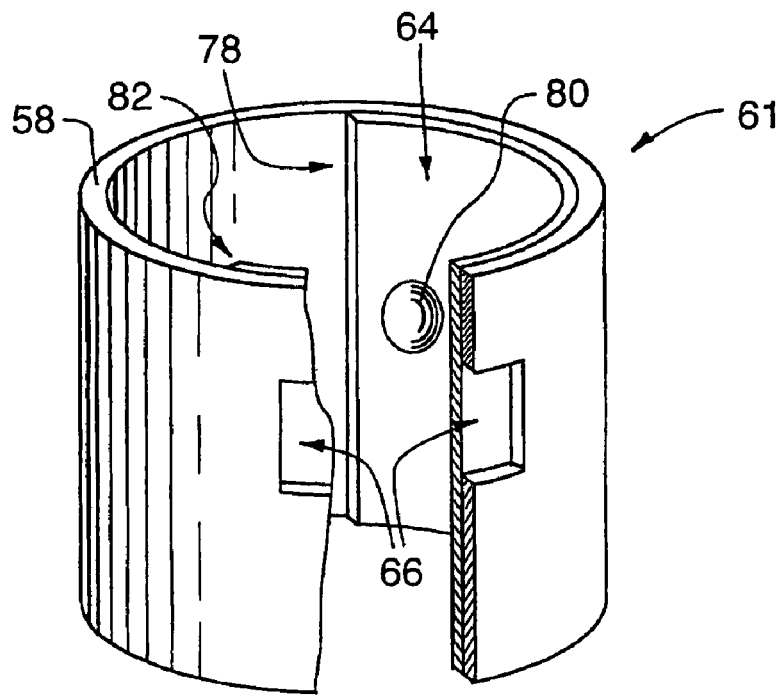
FIG. 13 is a partial cutaway view of the structure of FIG. 12.

The free end portion 82 is movable, by flexure of flapper 62, between an open position, as shown in FIG. 10B, and a closed position, as shown in FIG. 10A. In the open position, the flapper 62 is spaced apart from bypass opening 66, and in the closed position, the flapper 62 overlies the bypass aperture 66. The free end portion 82 is dimensioned to restrict, and more specifically, substantially arrest, flow through the bypass aperture 66 when disposed at its closed position; and is biased into the closed position by the flapper being formed of spring steel. For greater clarity in this regard, it should be understood that in the preferred embodiment illustrated, the flapper 62 is under compression when the free end portion 82 is at its closed position, such, that, if removed from the tube 58, it would assume a relatively flatter configuration (not shown).

The mechanical properties or spring constant of the flapper 62 may be selected to suit the operating parameters of the particular heat exchange element with which it is to be used. For example, the spring constant of flapper 62 can be chosen so that the flow through bypass aperture 66 or 74 occurs when the fluid pressure in bypass passage 72 exceeds a predetermined limit, which may be set below the burst strength of heat exchange element 22.

Figure 14:
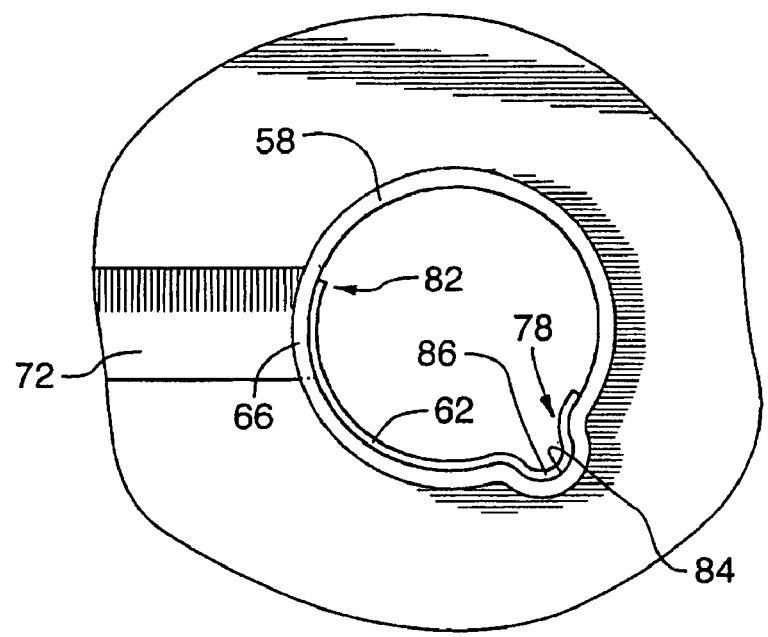
FIG. 14 is an enlarged plan view of a portion of FIG. 10A, showing a further preferred embodiment of the invention.

A further preferred embodiment of the invention is shown in FIG. 14. In this embodiment, tube 58 has a transverse groove 84 formed therein; the mounting end portion 78 of the flapper 62 has a corresponding transverse ridge 86; and the flapper 62 is located and fixed to the tube 58 by engagement of the ridge 86 in the groove 84 in the manner of a key in a keyway. Additionally, the flapper 62 is optionally shortened, such that the free end portion 82 of the flapper 62 overlies the bypass aperture 66 only in part, thereby to merely restrict, rather than substantially arrest bypass flow when disposed at its closed position.

Figure 15:
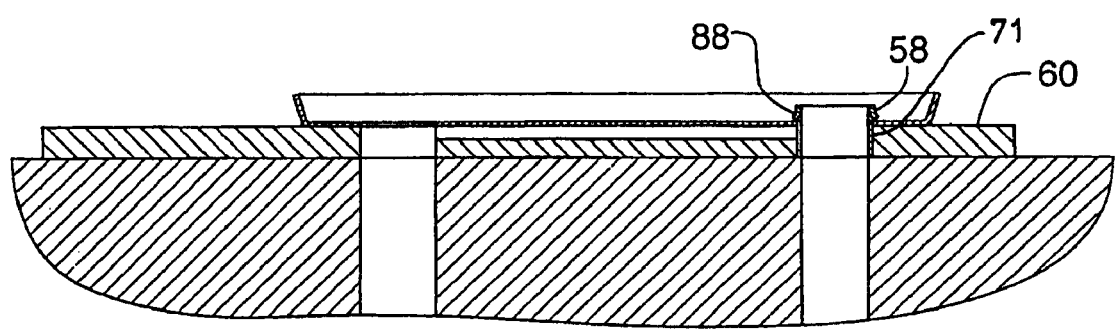
FIG. 15 is a view similar to FIG. 3, showing a yet further preferred embodiment of the invention.

A yet further preferred embodiment of the invention is shown in FIG. 15. In this embodiment, the tube 58 is provided with resilient tabs 88 which pop out after the tube 58 has been fitted into opening 71, so as to prevent withdrawal of the tube 58.

Figure 16:
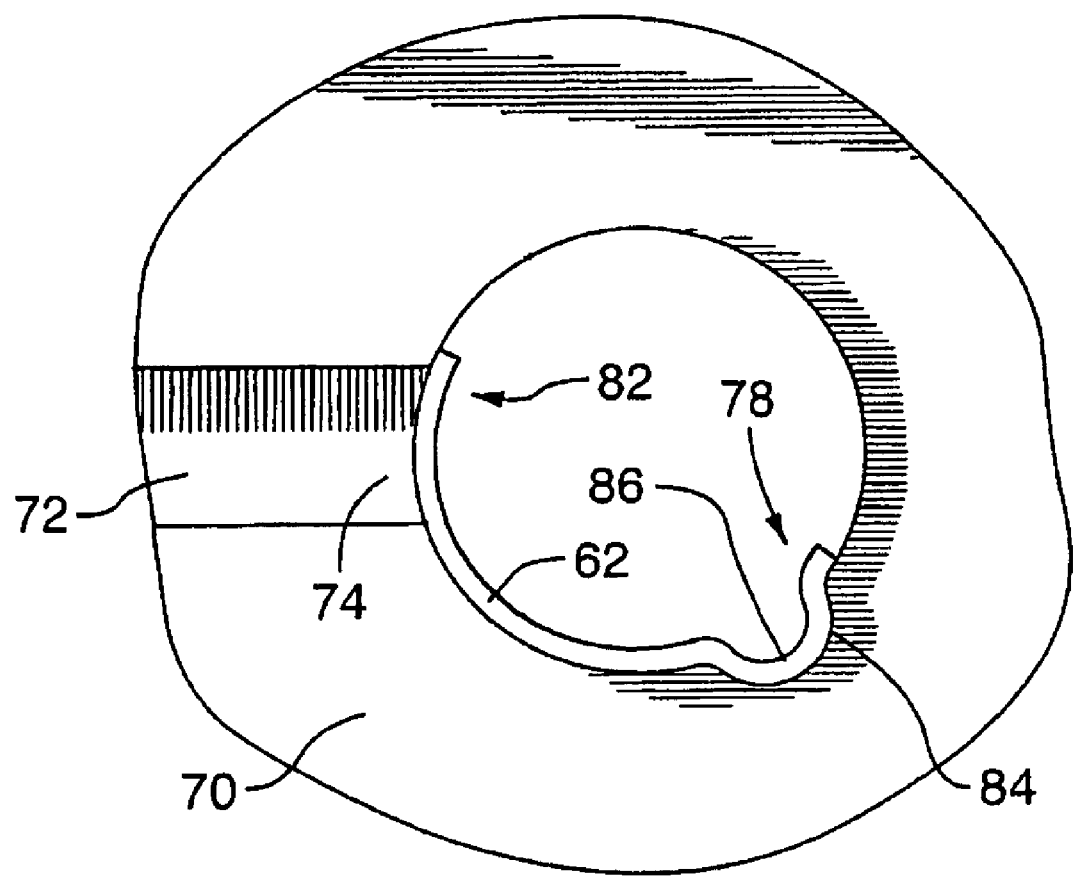
FIG. 16 is a plan view similar to FIG. 14, showing a further preferred embodiment of the invention.

FIG. 16 shows a further modification of the embodiment shown in FIG. 14, wherein the tube 58 has been eliminated. In this embodiment, transverse groove 84 is formed in cylindrical wall portion 70, and flapper 62 fully blocks or arrests flow through bypass opening 74 in cylindrical wall portion 70.

In use, in normal operating conditions, wherein relatively warm, substantially free-flowing oil is delivered to inlet opening 68, bias provided by the spring flapper 62 maintains the free end portion 82 of the flapper 62 in occluding relation against the bypass aperture 66 or 74 to restrict, and more specifically, substantially arrest bypass flow, with the possible exception of periodic, momentary burst flows or pressure spikes that may occur at inlet opening 68. This protects the heat exchange element 22.

In contrast, in conditions such as are present in the context of an engine start in relatively cold ambient conditions, wherein the oil is relatively cold, viscous oil is delivered to the inlet opening 68. In these circumstances, the inlet pressure to heat exchange element 22 is relatively large, with the result that the viscous oil forces the free end portion 82 of the flapper 62 away from the bypass aperture 66 or 74, as indicated by the sequence of FIGS. 10A, 10B, such that bypass flow circumvents the heat exchange element 22, thus again protecting it from excessive fluid pressures.

This structure is of particular advantage, in that it obtains relatively high cooling performance in normal operating conditions, when cooling is needed, as substantially all oil passes through the heat exchange element 22 to transfer its heat to the engine coolant in such conditions.

At the same time, the structure avoids starvation of mechanical components in normal transient high pressure conditions, such as cold weather startup, and also avoids metal fatigue that can result from pressure spikes in the thin-wall plates forming the heat exchanger.

As well, merely by modifying the structure of the main body member, the assembly can be readily tailored for use with flow devices of widely divergent structure. Advantageously, the main body member is brazed to the fluid device, and the components of the fluid device are brazed to one another, contemporaneously, and thereafter, the flapper valve is fitted within the outlet opening 71 in cylindrical wall portion 70, for subsequent shipping to an automotive manufacturer for installation.

Figure 17:
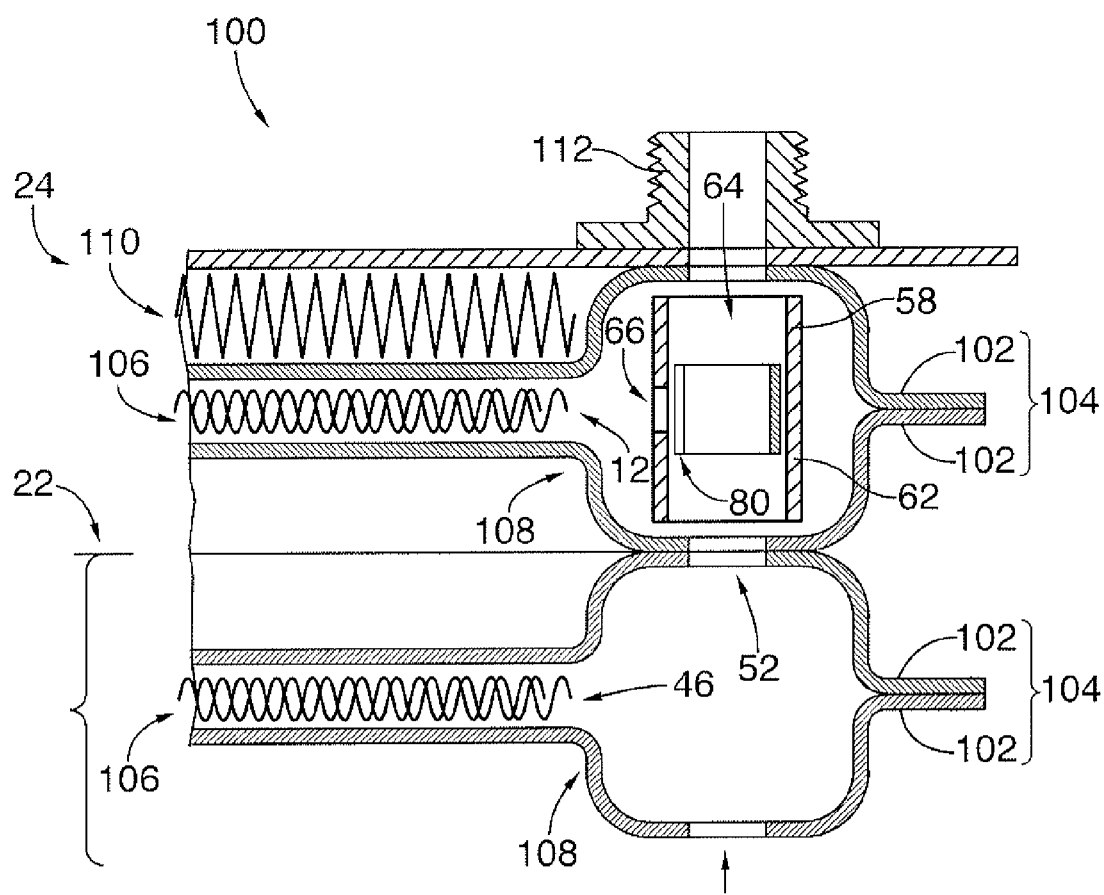
FIG. 17 is a partial cross-sectional view of a heat exchanger constructed according to a yet further embodiment of the invention.

A heat exchanger according to a further preferred embodiment of the invention is illustrated in partial cross-section in FIG. 17 and designated with general reference numeral 100. In this heat exchanger 100, tubes 104 formed of stacked, brazed plates 102 define the heat exchange passages 46 (only one shown) and bypass passage 72. Expanded metal turbulizers 106 are fitted between plates 102 in a conventional manner. Bubbles 108 defined by enlarged, raised bosses formed on the plates 102 mate with one another to form manifolds to deliver oil to the passages 46, 72 and receive oil therefrom. Tube 58 is fitted in the bubble 108 formed on the plates 102 defining the bypass passage 72 and communicating with the outlet 52 of the heat exchange element 22. Bypass aperture 66 in the tube 58 is orientated towards bypass passage 72, and flapper 62 is fitted within tube 58 in a manner identical to that previously described above. This heat exchanger 100 operates in a manner analogous to that previously described. In normal operating conditions, wherein relatively warm, substantially free-flowing oil is delivered to the inlet manifold (not shown), bias provided by the flapper 62 maintains the free end portion 82 of the flapper 62 in occluding relation against the bypass aperture 66 to restrict, and more specifically, substantially arrest flow through bypass passage 72, such that substantially all flow passes through the heat exchange element 22, through outlet 52, through tube 58 and ultimately out through fitting 112. In contrast, in relatively cold ambient conditions, the viscous oil forces the free end portion 82 of the flapper 62 away from the bypass aperture 66, such that bypass flow circumvents the heat exchange element 22 and travels instead through the bypass passage 72, through bypass aperture 66, and exits from tube 58 through fitting 112, again protecting the heat exchange element 22 from excessive fluid pressures. The tube 58 shown in FIG. 17 is fitted between the plates 102 before the plates 102 are brazed or otherwise secured together, and flapper 62 is inserted, in a snap-fit manner, after brazing. However, the tube 58 and flapper 62 could equally be inserted into the bubble 108 in a friction fit after plates 102 had been brazed together (not shown).

Having described preferred embodiments of the present invention, it will be appreciated that various modifications may be made to the structures described above without departing from the spirit or scope of the invention.

Firstly, whereas the bypass valve assembly of the preferred embodiments is shown in use with a heat exchanger, it should be understood that the invention is not so limited, and may be deployed in association with any fluid device having an inlet and an outlet.

It should also be understood that whereas the disclosure illustrates and describes heat exchangers of specific construction, modifications therein are also contemplated to fall within the scope of the invention.

Thus, for example, and without limitation, greater or lesser numbers of plates may be utilized to form the oil and coolant passages; the plates may be of different geometric construction; and may be sealed to one another by different methods, for example, by epoxy.

As well, turbulizers, of expanded metal or the like may be disposed between the plates of the heat exchanger of FIG. 1, as desired.

Further, whereas the bypass passage of the preferred embodiment is a groove formed in the main body member, with the passage-forming plates stacked upon the main body member forming an upper limit of the bypass passage, it will be evident that the bypass passage could, for example, be a channel or conduit formed entirely within the main body member, and thus not be dependent upon the passage-forming plate above for closure.

Yet further, whereas the main body portion is a machined plate in the preferred embodiment, it could equally be formed of one or more stamped plates, if it was desired to avoid machining.

As a further modification, whereas the flapper of the preferred embodiments consists of a strip of simple spring steel, a resilient bimetallic strip could be readily substituted therefor, to open and close under predetermined temperature conditions. A bimetallic strip, being resilient and flexible, would still provide pressure relief even in warm operating conditions.

Additionally, whereas the free end portion of the flapper of the preferred embodiments illustrated takes the form of a thin metal plate, modifications are possible. For example, the free end portion could be provided with a protuberance (not shown) that projects into the bypass aperture at the closed position to facilitate sealing, thereby to permit the relative amount of compression of the flapper valve at the closed position to be reduced, or to permit compression to be eliminated altogether, while still providing adequate sealing.

From the foregoing, it will be evident to persons of ordinary skill in the art that the scope of the present invention is limited only by the accompanying claims, purposively construed.

The invention claimed is:

1. A bypass valve assembly for use with a fluid device having an inlet and an outlet, said assembly comprising:
   at least one plate defining a main body having
      a transverse inlet opening defined therethrough, and
      a cylindrical wall portion defining a transverse outlet opening through the main body, the outlet opening being spaced from the inlet opening and orientated coaxially with the fluid device outlet in use, the cylindrical wall portion having a bypass opening formed therein, and
      a bypass passage formed in the main body and extending between the inlet opening and the bypass opening; and
   a flexible flapper disposed and maintained within the outlet opening, the flapper having a free end portion movable between an open position, apart from the bypass opening, and a closed position, overlying the bypass opening, the free end portion being dimensioned to restrict flow through the bypass opening when disposed at its closed position;
   wherein the flapper is biased into the closed position; and
   wherein the inlet and outlet openings are coupled in use in fluid communication respectively with the fluid device inlet and outlet for fluid flow through the fluid device.

2. A bypass valve assembly according to claim 1 wherein the free end portion is dimensioned to substantially arrest flow through the bypass opening when disposed at its closed position.

3. A bypass valve assembly according to claim 1 wherein the flapper is constructed from spring steel and thereby biased for movement to the closed position.

4. A bypass valve assembly according to claim 1 and further comprising a tube releasably mounted in the main body outlet opening, the tube defining a bypass aperture in communication with the cylindrical wall portion bypass opening
   wherein the flexible flapper is disposed and maintained within the tube, and
   wherein, in the open position, the flapper free end portion is apart from the bypass aperture, and, in the closed position, the flapper free end portion overlies the bypass aperture to restrict flow through the bypass aperture.

5. A bypass valve assembly according to claim 4 wherein the tube is dimensioned to be frictionally held within the outlet opening.

6. A bypass valve assembly according to claim 4 wherein a rivet attaches the flapper to the tube.

7. A bypass valve assembly according to claim 4 wherein the cylindrical wall portion has a transverse groove formed therein and the rivet is partially located in the groove.

8. A bypass valve assembly according to claim 7 wherein the flapper has a mounting end portion remote from the free end portion, the rivet passing through the mounting end portion of the flapper.

9. A heat exchanger comprising:
   a heat exchange element having a spaced-apart inlet and outlet and a plurality of heat exchange passages therebetween, and
   a bypass valve assembly including:
      at least one plate defining a main body connected to the heat exchange element and having
         a transverse inlet opening defined therethrough and communicating with the heat exchange element inlet,
         a cylindrical wall portion defining a transverse outlet opening through the main body, the outlet opening being orientated coaxially and communicating with the heat exchange element outlet, the cylindrical wall portion having a bypass opening formed therein, and a bypass passage formed in the main body and extending between the inlet opening and the bypass opening;

a flexible flapper disposed and maintained within the outlet opening, the flapper having a free end portion movable between an open position, spaced from the bypass opening, and a closed position, overlying the bypass opening, the free end portion being dimensioned to restrict flow through the bypass opening when disposed at its closed position;

wherein the flapper is biased for movement into the closed position.

10. A heat exchanger according to claim 9 wherein the flapper formed of spring steel to provide said bias, the spring constant of the spring steel being such that flow through the bypass opening occurs when the fluid pressure in the bypass passage exceeds a predetermined limit.

11. A heat exchanger according to claim 9 and further comprising a tube releasably mounted in the main body outlet opening, the tube defining a bypass aperture in communication with the cylindrical wall portion bypass opening wherein the flexible flapper is disposed and maintained within the tube, and wherein, in the open position, the flapper free end portion is apart from the bypass aperture, and, in the closed position, the flapper free end portion overlies the bypass aperture to restrict flow through the bypass aperture.

12. A heat exchanger according to claim 11 wherein the cylindrical wall portion has a transverse groove formed therein and a rivet attaches the flapper to the tube, the rivet being partially located in the groove.

* * * * *